Patented Feb. 4, 1936

2,029,893

UNITED STATES PATENT OFFICE 2,029,893

PROCESS FOR MAKING CONDENSATION PRODUCTS

Kurt Ripper, Vienna, Austria

No Drawing. Application March 5, 1931, Serial No. 520,478. In Austria December 15, 1930

18 Claims. (Cl. 260—3)

This invention relates to the manufacture of condensation products of thiourea or mixtures of thiourea and urea with formaldehyde, which condensation products are exceedingly well suited for being used as agglutinants or impregnating agents in manufacturing laminated sheets (particularly of paper, tissue or asbestos), moreover also in general as impregnating and coating means or as a base of lacquers, furthermore as binding agents for molding compositions containing fibrous materials and finally as compositions to be used for die casting. The process consists essentially in reacting without applying heat with less than 2 mols, preferably 1½ mols, of formaldehyde upon 1 mol of thiourea or of a mixture of thiourea and urea at a higher hydrogen ion concentration than corresponds to the value pH=5, consequently at a pH that has a lower number than 5. Preferably the hydrogen ion concentration is adjusted so as to correspond to the value pH=3. Hydrogen-ion concentration is also sometimes expressed as $C_H$, using numbers with minus exponents to indicate the actual concentration of hydrogen ions in the solution or aqueous medium. The relationship between $C_H$ and pH is as follows:

$$pH = \log_{10} 1/C_H.$$

Hence $C_H = 10^{-5}$ is expressive of the same hydrogen-ion concentration as pH=5; and $C_H = 10^{-3}$ is equivalent to pH=3.

By reacting in the cold with formaldehyde upon urea at a pH of less than 5 a white insoluble product serving no useful purpose is generated (Cf. e. g. Beilstein-Prager-Jacobson, "Handbuch der organischen Chemie", 3rd edition 1921, Tome IV. page 48). Thus for instance a solution of 60 parts by weight (1 mol) of urea in 150 parts by weight of an aqueous formaldehyde solution containing 30% by weight (1½ mols) of formaldehyde, which by the addition of phosphoric acid had been brought to a hydrogen ion concentration corresponding to pH of about 3, will pass at room temperature (about 20° C.) within a few minutes into a white crumbly cake unfit for anything. But the reaction will turn out quite differently, if the urea is without any other modification of the operating conditions entirely or partly replaced by thiourea. If for instance in the above specified starting mixture half of the 60 parts by weight of the urea, that is 30 parts by weight or ½ mol, is replaced by 38 parts by weight (½ mol) of thiourea, at the temperature of 20° C. a solution results, which remains clear as water for hours and with an addition of organic solvents such as for instance ethyl alcohol, will not show the least turbidity even after having stood at rest for 24 hours.

As is well known, the course of the condensation of urea with formaldehyde when carefully operating in a neutral or alkaline solution can be interrupted at a stage, in which the simple chemical compounds methylol urea and dimethylol urea (or mixtures of these compounds) are formed, which do not yet show any tendency to polymerization, but are capable of further condensation. Now I have succeeded in breaking the continuity of the reaction in the condensation of thiourea (or of mixtures of thiourea and urea) with formaldehyde, by operating in an acid solution without heating. By this way of proceeding first of all true solutions of simple chemical compounds are produced, whereas the reaction between urea and formaldehyde, as has been mentioned above, will under the same conditions proceed without interruption up to the formation of useless insoluble masses. In the acid solution of the firstly generated simple thiourea (or thiourea and urea) formaldehyde condensation products the formation of complex compounds capable of polymerization and a slowly progressing polymerization will take place, during which the condensation products are by growth of the molecules successively transformed into the colloidal state. These reaction products can therefore by systematically conducting the reaction be brought into a state of polymerization which is adjusted to convenience, that is to say lower or higher, but in any case uniform. In addition thereto the colloids finally formed by this process are hydrophobe, so that they will give off the water associated therewith easily and completely.

By other workers the interaction of thiourea and formaldehyde, when effected in an acid medium and without applying heat, has been found to yield a crystalline condensation product of the composition $C_2H_4N_2S$ which is said to be unsoluble in all solvents and to be decomposed, with browning and effervescence, at about 202–203° C. This compound is a dimethylene-thiocarbamide which does not have the character of artificial resins and does not pass over into such resins when being heated but on the contrary is decomposed by heat with or without the action of pressure, and therefore cannot be used for the production of artificial masses. It was learned from experimental work that the reaction takes this turn when the hydrogen ion concentration exceeds a certain limit, but this limit depends also on the proportion of thiourea present when the starting material is a mixture of urea and thiourea, and on the temperature. Consequently only the rule may be given concerning the hydrogen ion concentration fit for the present process, that the condensation has to be effected at a pH 5, and that there is an upper limit giving rise to the generation of the said methylene-compound, and that in the present process the hydrogen ion concentration has to be adjusted so, as to lie between these two limits.

For manufacturing laminated sheets, the base material (paper or fabric) is in the form of sheets or of endless webs impregnated with the cold solutions of the condensation products, to which, if required, filling materials, coloring substances or pigments may be added. The solution applied to the material in this way is then preferably evaporated also without heating, whereafter a suitable number of such layers, one laid upon the other, are in the usual manner by the action of heat and pressure united and so to say welded together.

The products thus obtained are of beautiful aspect and show excellent mechanical and electrical properties. The non-filled material is translucent and may be colored or streaked in any shade. The material can be bored, filed, milled, polished and in the warm state also easily stamped. Its mechanical strength is very great, various objects, articles, pieces and parts exposed to considerable mechanical strain may be made therefrom such as for instance parts of gearings, toothed wheels, highly strained parts of textile and other machines, centrifugal pots for spinning machines etc. Likewise they are adapted for manifold use in electrotechnics (low and high voltage technics, heavy current and communication engineering and particularly in high frequency technics). Owing to the fact that the dielectric power factor of these products depends to a very low degree upon the temperature, they are also particularly suited for the construction of transformers. Moreover as they are insensitive to water, alkalies and acids, these nice looking pressed materials can be used to a large extent for the manufacture of many articles of daily use, furniture etc. and finally also for building purposes. Thus for instance a substitute for veneers of hitherto unequalled chemical properties may be made therefrom, which by itself or in combination with other materials (such as iron) may be used for manufacturing furniture and is also most appropriate as a covering for walls.

A special advantage of these products consists in that the structure of the paper or the tissue (other than asbestos) disappears nearly completely, so that, in contradistinction to the laminated sheets made by means of phenol-formaldehyde condensation products, the masses have in all directions the same structure and are therefore more resistant in chemical as well as in mechanical respects. The products are for instance not liable to splitting and for this reason can be used for more purposes and to a greater extent than the hitherto known materials.

For manufacturing molding compositions the fibres are with or without the addition of other fillers, dyes or pigments mixed with the solution, whereafter the mixture is allowed to rest at ordinary room temperature until at first it will become air-dry and thereupon the condensation product contained therein will have been brought into a conveniently high but uniform state of polymerization. This finish of the polymerization process may be assisted by being effected at slightly elevated temperature. In doing so it is, particularly for producing quick molding compositions, advisable to moisten the mixture in the last state of warming and thus to ensure that the small residue of water, thanks to which the molding composition is capable of flowing in the hot press, is still present, when the desired degree of polymerization is attained. It is, however, not at all necessary under all circumstances to render the mixture ready for being pressed by warming. On the contrary, by adjusting the hydrogen ion concentration also at ordinary temperature any desired degree of polymerization assuring the capability of quick hot pressing can be attained at will.

For manufacturing mixtures suitable for molding by die casting the air dried mixture of the solution of the condensation products with fibrous materials is at low temperature, preferably without application of heat, dried down to a low content of water which is just sufficient to secure the flowing of the mixture in the die cast under the action of heat.

*Examples*

(1) 76 kilograms (1 mol.) of thiourea are in a finely powdered state under agitation dissolved in 300 kilograms of an aqueous formaldehyde solution containing 30 per cent by weight (3 mols) of formaldehyde. Then ½ to 1 kilogram of phosphoric acid and 60 kilograms (1 mol.) of urea are added to this solution. Now paper or fabric of linen or asbestos is in a suitable manner impregnated with this solution and then kept during 24 hours at room temperature, during which time the excess of water dries off. The impregnated single sheets may now be further worked up by any method usually employed in the manufacture of laminated sheets from phenol-formaldehyde condensation products. For producing plates or blocks the sheets, a suitable number of which is superposed one upon the other, are at a temperature of 120° to 140° C. pressed together, whereby the binding agent first of all turns into a flowing state and then unites the whole to a uniform mass. The time required for curing is considerably shorter than can be attained with fabrics impregnated with the usual phenol-formaldehyde condensation products. For manufacturing tubes or other hollow bodies of any cross-section the winding methods and machines as employed in manufacturing pheno-plastics are used.

(2) By disintegration of the laminated sheets made according to Example 1 to particles of a size of about 1 centimeter and hot pressing the disintegrated mass under high pressure molded pieces of particularly high mechanical strength can be made. For this mode of carrying out the process especially laminated linen sheets are most appropriate.

(3) For manufacturing molding compositions fibrous materials of animal, vegetable or mineral origin, for instance paper strips are in an efficiently working kneading apparatus intimately mixed with the solution prepared according to Example 1. The mixture is thereafter agitated, for instance in a rotating drum, until air-dry, and in order to bring the binding agent in a state of polymerization which is as high as possible, while leaving still such a remainder of water as will assure that the molding powder will flow in the hot press. From these molding compositions homogeneous artificial masses, materials or pressed pieces are made in the usual manner by applying heat and high pressure.

If compositions adapted for die casting are to be made, the air dried mixture is agitated further on at room temperature (20° C.) until only the little amount of water will remain which is just sufficient to secure the flowing of the composition in the die cast.

If in both these cases heat is applied for the purpose of advancing the drying and polymerization, the mass (molding powder or composition for die casting) may at first be allowed to become dry and thereupon be remoistened in the last stage of warming so that the finished mass contains the small amount of water which secures its thermo-plasticity.

The solutions obtained according to the process of the invention may besides the use for producing laminated sheets also be employed either with or without the addition of volatile solvents (such as alcohol) and of softening agents, such, for instance, as sulphoricinoleic acid, as impregnating means in the narrower sense, e. g. for making electrical insulations by impregnation of coils and accessories or for impregnating wood, leather, fabrics, card board etc. or also as a base of lacquers. Also for lining apparatus with or without inserting fabrics they may be employed. In all these cases the application of the solution has of course to be followed by a polymerization in the heat.

The process may also be carried out by causing preliminarily prepared monomethylol urea or dimethylol urea (or mixtures of these compounds) to take part in the condensation of thiourea and formaldehyde under the above specified conditions. The proportion of formaldehyde has in such case of course to be diminished for the amount belonging to the urea portion.

It is already known, that the velocity of the mutual reaction of urea and formaldehyde on the one hand and thiourea and formaldehyde on the other is a different one, so that in contradistinction to the quick reaction between urea and formaldehyde resulting in that the dehydration of the generated reaction products causes very great difficulties, the aqueous solutions produced by the condensation of thiourea with formaldehyde in a neutral medium can be evaporated without difficulties while passing, if desired, air or inert gases therethrough (British patent specification No. 248,477). Condensation products thus made have already been used as binding agents for molding compositions containing fibrous materials, solid substances of acid nature having been added for the purpose of shortening the time required for curing (British patent specification No. 258,950). Later on, to dispense with the incorporation of such additions, the way has been chosen of condensing mixtures of urea and thiourea with formaldehyde or of separately condensing urea and thiourea with formaldehyde and mixing the reaction solutions, and of concentrating the solutions obtained in the one or the other way by evaporation or by blowing in air, or of completely evaporating them (British patent specification No. 266,028). Also in this method the condensation takes place without the addition of condensing agents at a temperature between 50° and 70° C. whereafter the solution is concentrated by evaporation at a temperature of 70° to 80° C. The most valuable progress realized by effecting the condensation in a strongly acid medium but without the application of heat has not been revealed to the art by this known process.

In the hereunto appended claims the term $C_H=10^{-5}$ is equivalent to pH=5, and the expression "a hydrogen-ion concentration exceeding $C_H=10^{-5}$" means that the aqueous medium contains more hydrogen ions than $C_H=10^{-5}$; i. e., the solution is more acid.

What I claim is:—

1. The process of producing hydrophobe urea-thiourea-formaldehyde reaction products which comprises reacting 1 mol of a mixture of thiourea and urea with less than 2 mols of formaldehyde with less than 2 mols of formaldehyde without addition of external heat in an aqueous medium having a hydrogen-ion concentration of about $C_H=10^{-3}$, the amount of thiourea contained in the said mixture being sufficient to prevent formation of white insoluble formaldehyde-urea products.

2. The process of producing hydrophobe urea-thiourea-formaldehyde reaction products which comprises reacting 1 mol of a mixture of thiourea and urea with less than 2 mols of formaldehyde at a temperature not substantially exceeding 20° C. in an aqueous medium having a hydrogen-ion concentration of about $C_H=10^{-3}$, the amount of theiourea contained in the said mixture being sufficient to prevent the formation of white insoluble formaldehyde-urea products.

3. The process of producing hydrophobe urea-thiourea-formaldehyde reaction products which comprises reacting 1 mol of an equimolecular mixture of thiourea and urea with less than 2 mols of formaldehyde without addition of external heat in an aqueous medium having a hydrogen-ion concentration of about $C_H=10^{-3}$.

4. The process of producing hydrophobe urea-thiourea-formaldehyde reaction products which comprises reacting 1 mol of an equimolecular mixture of thiourea and urea with less than 2 mols of formaldehyde at a temperature not substantially exceeding 20° C. in an aqueous medium having a hydrogen-ion concentration of about $C_H=10^{-3}$.

5. A moldable mixture of filler and a hydrophobe urea-thiourea-formaldehyde reaction product, which latter is produced by reacting 1 mol. of a mixture of thiourea and urea with less than 2 mols of formaldehyde without addition of external heat in an aqueous medium having a hydrogen-ion concentration of about $C_H=10^{-3}$, the amount of thiourea contained in the said mixture being sufficient to prevent formation of white insoluble formaldehyde-urea products.

6. A moldable mixture of filler and a hydrophobe urea-thiourea-formaldehyde reaction product, which latter is produced by reacting 1 mol. of a mixture of thiourea and urea with less than 2 mols of formaldehyde at a temperature not substantially exceeding 20° C. in an aqueous medium having a hydrogen-ion concentration of about $C_H=10^{-3}$, the amount of thiourea contained in the said mixture being sufficient to prevent the formation of white insoluble formaldehyde-urea products.

7. A moldable mixture of filler and a hydrophobe urea-thiourea-formaldehyde reaction product, which latter is produced by reacting 1 mol. of an equimolecular mixture of thiourea and urea with less than 2 mols of formaldehyde without addition of external heat in an aqueous medium having a hydrogen-ion concentration of about $C_H=10^{-3}$.

8. A moldable mixture of filler and a hydrophobe urea - thiourea - formaldehyde reaction product, which latter is produced by reacting 1 mol. of an equimolecular mixture of thiourea and urea with less than 2 mols of formaldehyde at a temperature not substantially exceeding 20° C. in an aqueous medium having a hydrogen-ion concentration of about $C_H=10^{-3}$.

9. The process of producing hydrophobe urea-thiourea-formaldehyde reaction products which comprises reacting 1 mol. of a mixture of thiourea and urea with less than 2 mols of formaldehyde without addition of external heat in an aqueous medium having an acidity between $C_H=10^{-5}$ and about $C_H=10^{-3}$, the amount of thiourea contained in the said mixture being sufficient to prevent formation of white insoluble formaldehyde-urea products.

10. The process of producing hydrophobe urea-thiourea-formaldehyde reaction products which comprises reacting 1 mol. of a mixture of thiourea and urea with less than 2 mols of formaldehyde at a temperature not substantially exceeding 20° C. in an aqueous medium having an acidity between $C_H=10^{-5}$ and about $C_H=10^{-3}$, the amount of thiourea contained in the said mixture being sufficient to prevent formation of white insoluble formaldehyde-urea products.

11. The process of producing hydrophobe urea-thiourea-formaldehyde reaction products which comprises reacting 1 mol. of an equimolecular mixture of thiourea and urea with less than 2 mols of formaldehyde without addition of external heat in an aqueous medium having an acidity between $C_H=10^{-5}$ and about $C_H=10^{-3}$.

12. The process of producing hydrophobe urea-thiourea-formaldehyde reaction products which comprises reacting 1 mol. of an equimolecular mixture of thiourea and urea with less than 2 mols of formaldehyde at a temperature not substantially exceeding 20° C. in an aqueous medium having an acidity between $C_H=10^{-5}$ and about $C_H=10^{-3}$.

13. A moldable mixture of filler and a hydrophobe urea - thiourea - formaldehyde reaction product, which latter is produced by reacting 1 mol. of a mixture of thiourea and urea with less than 2 mols of formaldehyde without addition of external heat in an aqueous medium having an acidity between $C_H=10^{-5}$ and about $C_H=10^{-3}$, the amount of thiourea contained in the said mixture being sufficient to prevent formation of white insoluble formaldehyde-urea products.

14. A moldable mixture of filler and a hydrophobe urea - thiourea - formaldehyde reaction product, which latter is produced by reacting 1 mol. of a mixture of thiourea and urea with less than 2 mols of formaldehyde at a temperature not substantially exceeding 20° C. in an aqueous medium having an acidity between $C_H=10^{-5}$ and about $C_H=10^{-3}$, the amount of thiourea contained in the said mixture being sufficient to prevent formation of white insoluble formaldehyde-urea products.

15. A moldable mixture of filler and a hydrophobe urea - thiourea - formaldehyde reaction product, which latter is produced by reacting 1 mol. of an equimolecular mixture of thiourea and urea with less than 2 mols of formaldehyde, without addition of external heat in an aqueous medium having an acidity between $C_H=10^{-5}$ and about $C_H=10^{-3}$.

16. A moldable mixture of filler and a hydrophobe urea - thiourea - formaldehyde reaction product, which latter is produced by reacting 1 mol. of an equimolecular mixture of thiourea and urea with less than 2 mols of formaldehyde at a temperature not substantially exceeding 20° C. in an aqueous medium having an acidity between $C_H=10^{-5}$ and about $C_H=10^{-3}$.

17. The process of producing a hydrophobe product from thiourea and formaldehyde which is capable of being maintained in clear solution for an extended period so as to facilitate the application of the resinous material to a foil, which comprises reacting 1 mol. of thiourea with less than 2 mols of formaldehyde without the application of external heat in an aqueous medium which is more acid than $C_H=10^{-5}$ and less acid than about $C_H=10^{-3}$, so that insoluble thiourea-formaldehyde products capable of clouding the solution will not form.

18. The process of producing a hydrophobe product from thiourea and formaldehyde which is capable of being maintained in clear solution for an extended period so as to facilitate the application of the resinous material to a foil, which comprises reacting 1 mol. of thiourea with less than 2 mols of formaldehyde at a temperature not substantially exceeding 20° C. in an aqueous medium which is more acid than $C_H=10^{-5}$ and less acid than about $C_H=10^{-3}$, so that insoluble thiourea-formaldehyde products capable of clouding the solution will not form.

KURT RIPPER.